(12) United States Patent
Lett et al.

(10) Patent No.: US 11,052,787 B2
(45) Date of Patent: Jul. 6, 2021

(54) SEAT ADJUSTMENT MECHANISM

(71) Applicant: McLaren Automotive Limited, Woking (GB)

(72) Inventors: Barry Lett, Surrey (GB); Christopher Lee Bates, Surrey (GB)

(73) Assignee: McLaren Automotive Limited, Woking (GB)

( * ) Notice: Subject to any disclaimer, the term of this patent is extended or adjusted under 35 U.S.C. 154(b) by 106 days.

(21) Appl. No.: 16/461,735

(22) PCT Filed: Nov. 17, 2017

(86) PCT No.: PCT/GB2017/053460
§ 371 (c)(1),
(2) Date: May 16, 2019

(87) PCT Pub. No.: WO2018/091907
PCT Pub. Date: May 24, 2018

(65) Prior Publication Data
US 2019/0315249 A1    Oct. 17, 2019

(30) Foreign Application Priority Data

Nov. 18, 2016   (GB) ...................... 1619544

(51) Int. Cl.
*B60N 2/16*   (2006.01)
*B60N 2/18*   (2006.01)
(Continued)

(52) U.S. Cl.
CPC ............. *B60N 2/06* (2013.01); *B60N 2/0232* (2013.01); *B60N 2/045* (2013.01); *B60N 2/1615* (2013.01);
(Continued)

(58) Field of Classification Search
CPC .... B60N 2/1615; B60N 2/045; B60N 2/1814; B60N 2/507; B60N 2/1695
See application file for complete search history.

(56) References Cited

U.S. PATENT DOCUMENTS

| 5,882,061 A | * | 3/1999 | Guillouet | ............. | B60N 2/1615 |
|---|---|---|---|---|---|
| | | | | | 248/421 |
| 2003/0178877 A1 | * | 9/2003 | Schmale | ................ | B60N 2/045 |
| | | | | | 297/313 |

(Continued)

FOREIGN PATENT DOCUMENTS

| DE | 102013101540 A1 | * | 8/2014 | ............... B60N 2/06 |
|---|---|---|---|---|
| EP | 1938713 A1 | | 7/2008 | |

(Continued)

OTHER PUBLICATIONS

International Searching Authority, International Search Report and Written Opinion for International Application No. PCT/GB2017/053460, dated Feb. 15, 2018, 15 pages, European Patent Office, The Netherlands.

(Continued)

*Primary Examiner* — Timothy J Brindley
(74) *Attorney, Agent, or Firm* — Alston & Bird LLP

(57) ABSTRACT

A vehicle seat having a base (10) and a squab (11) and an adjustment mechanism (20) whereby the position of an occupant sitting in the seat can be adjusted, the mechanism being configured so as to permit the seat to follow a motion path that provides coordinated adjustment of both height and back inclination of the occupant, the motion path being such that as the height of the occupant is raised the back inclination of the occupant becomes less supine.

17 Claims, 2 Drawing Sheets

(51) Int. Cl.
*B60N 2/04* (2006.01)
*B60N 2/06* (2006.01)
*B60N 2/02* (2006.01)

(52) U.S. Cl.
CPC ......... *B60N 2/1695* (2013.01); *B60N 2/1814* (2013.01); *B60N 2/1864* (2013.01)

(56) References Cited

U.S. PATENT DOCUMENTS

| | | | |
|---|---|---|---|
| 2009/0195039 A1* | 8/2009 | Fujita | B60N 2/7058 297/313 |
| 2009/0230730 A1* | 9/2009 | Ohtsubo | B60N 2/067 296/193.07 |
| 2009/0242700 A1* | 10/2009 | Raymond | B60N 2/23 244/118.6 |
| 2011/0068608 A1* | 3/2011 | Ohtsubo | B60N 2/0252 296/193.07 |
| 2011/0094317 A1 | 4/2011 | Aoyama et al. | |
| 2012/0104819 A1* | 5/2012 | Line | B60N 2/1828 297/326 |
| 2014/0175249 A1 | 6/2014 | Becker et al. | |
| 2014/0361592 A1* | 12/2014 | Kuno | B60N 2/06 297/325 |

FOREIGN PATENT DOCUMENTS

| | | |
|---|---|---|
| EP | 1995111 A1 | 11/2008 |
| EP | 2567861 A1 | 3/2013 |
| EP | 2955057 A1 | 12/2015 |
| GB | 458925 A | 12/1936 |
| WO | WO-2011/153665 A1 | 12/2011 |

OTHER PUBLICATIONS

Intellectual Property Office, United Kingdom Search Report for Great Britain Application No. 1619544.8, dated May 18, 2017, 4 pages United Kingdom Search Report, South Wales, United Kingdom.

* cited by examiner

SEAT ADJUSTMENT MECHANISM

CROSS REFERENCE TO RELATED APPLICATIONS

This application is a National Stage Application, filed under 35 U.S.C. § 371, of International Application No. PCT/GB2017/053460, filed Nov. 17, 2017, which claims priority to United Kingdom Application No. 1619544.8, filed Nov. 18, 2016; the contents of both of which are hereby incorporated by reference in their entirety.

BACKGROUND

Related Field

This invention relates to mechanisms for adjusting the position of a seat, for example in a vehicle.

Description of Related Art

In a conventional road-going automobile, the position of the driver's seat can be adjusted relative to the body of the vehicle so that the driver can reach the controls comfortably. Typically, the seat is attached to the floor pan of the vehicle by an adjustment mechanism. The adjustment mechanism can be operated to raise or lower the seat in a vertical direction (i.e. in the vehicle's Z axis), and often to adjust the rake of the seat base (i.e. for rotation about the vehicle's Y axis) by adjusting the height of the front and the rear of the seat base independently. The adjustment mechanism is mounted to rails that run along the floor pan in the vehicle's X direction. The adjustment mechanism can be moved along the rails to provide fore and aft positional freedom of the seat.

Typically, the seat has a seat base and a seat squab or back which are formed as separate elements and are interconnected by a further adjustment mechanism that permits the rake of the seat squab relative to the base to be adjusted. In some performance-oriented cars the seat is a bucket seat having the base and the squab formed integrally with each other.

A problem with conventional seat adjustment mechanisms is that they can be heavy. In addition to the apparatus required to support the seat and provide for its motion, which are typically made of steel pressings, for each class of motion provided by the adjustment mechanism there may be an electric motor to drive the motion and/or a damper to prevent sudden movement of the seat. These add further to the weight of the mechanism.

To reduce weight, some racing cars have a seat that is fixed in position for a particular driver. This approach is unsuitable for a consumer vehicle.

There is a need for a seat mechanism that provides for adjustment to suit different occupants, but with relatively low weight.

BRIEF SUMMARY

According to the present invention there is provided a vehicle seat having a base and a squab and an adjustment mechanism whereby the position of an occupant sitting in the seat can be adjusted, the mechanism being configured so as to permit the seat to follow a motion path that provides coordinated adjustment of both height and back inclination of the occupant, the motion path being such that as the height of the occupant is raised the back inclination of the occupant becomes less supine.

The path may be coordinated in that as the seat is moved it automatically follows a path in which both height and back inclination are altered simultaneously. For any given height position the mechanism may provide for a single corresponding back inclination. The mechanism may coordinate the motion by means of a mechanical linkage which provides for adjustment of both height and back inclination. The mechanism may be such that it does not permit independent adjustment of height and back inclination. An additional mechanism may be provided that permits one or moth of height and back inclination to be adjusted independently of the other.

The motion path may provide adjustment of the H point height of the seat.

The base and the squab may be integral with each other.

The motion path may be such that the maximum torso line inclination of an occupant achievable by the mechanism is greater than 28 degrees, 30 degrees, 32 degrees, 34 degrees or 36 degrees from vertical. These parameters may pertain when any other adjustment facilities of the seat are set such that the seat is in a sitting position, as opposed to a loading or stowed position.

Over a range of motion of the mechanism, the mean decrease in supine inclination of the torso line of an occupant may be between 0.2 and 0.5 degrees per millimetre of increase in height of the H point of the seat. Over a range of motion of the mechanism, the mean decrease in supine inclination of the torso line of an occupant may be between 0.32 and 0.42 degrees per millimetre of increase in height of the H point of the seat.

The motion path may be such that as the height of the occupant is raised the H point of the seat is moved rearwards. The motion path may be such that as the height of the occupant is raised the front of the base lowers. The motion path may be such that as the height of the occupant is raised the position of the squab relative to the base is fixed.

Over a range of motion of the mechanism, the mean rearwards motion of the H point may be between 1 mm and 3 mm per millimetre of increase in height of the H point of the seat. Over a range of motion of the mechanism, the mean rearwards motion of the H point may be between 1.3 mm and 2.3 mm per millimetre of increase in height of the H point of the seat.

The said range of motion may be the entire range of motion provided by the mechanism.

The said range of motion may encompass more than 5 degrees of variation in the torso line of an occupant.

The said range of motion may encompass a state of the seat in which the torso line of an occupant is at 31 degrees of supine inclination to vertical.

The said range of motion may encompass a state of the seat in which the torso line of an occupant is at 35 degrees of supine inclination to vertical.

The said range of motion may encompass more than 10 mm of variation in the height of the H point of the seat.

The seat may be mounted to a vehicle floor pan. The seat may be configured to be mountable to a vehicle floor pan. The adjustment mechanism may be configured to mount the base and squab to the vehicle floor pan.

The seat may further comprise one or more rails running longitudinally with respect to the seat, the mechanism being mounted on the rails so that it can be moved longitudinally with respect to the rails.

The mechanism may comprise a base part, a forward link mounted between the base part and the seat base such that it can rotate with respect to both the base part and the seat base, and a rear link mounted between the base part and the seat base such that it can rotate with respect to both the base part and the seat base, the rear link being located rearwardly for the forward link, and the motion path of the seat being provided by rotation of the forward and rear links with respect to the base part and the seat base. The links may be such that the distance between the rotation axis of the forward link with respect to the base part and the rotation axis of the forward link with respect to the seat base is different from the distance between the rotation axis of the rear link with respect to the base part and the rotation axis of the rear link with respect to the seat base. This may promote a motion path of the seat as defined above.

According to a second aspect of the invention there is provided a vehicle comprising a seat as claimed in any preceding claim. The seat may be a driver's seat or a passenger's seat. The seat may be in a front or only row of seating. The seat may be positioned such that the vehicle has no other seat forward of the said seat. The vehicle may be a land vehicle. The vehicle may be a sports car.

According to a third aspect of the invention there is provided a vehicle seat being configured to be mountable to a vehicle floor pan, the seat having a base and a squab and an adjustment mechanism whereby the position of an occupant sitting in the seat can be adjusted, the mechanism being configured so as to permit the seat to follow a motion path that provides coordinated adjustment of both height and back inclination of the occupant, the motion path being such that as the height of the occupant is raised: (i) the back inclination of the occupant becomes less supine, (ii) the H point of the seat is moved rearwards, (iii) the front of the base lowers, and (iv) the position of the squab relative to the base is fixed.

BRIEF DESCRIPTION OF THE FIGURES

The present invention will now be described by way of example with reference to the accompanying drawings. In the drawings.

DETAILED DESCRIPTION OF VARIOUS EMBODIMENTS

The seat illustrated in the figures has an adjustment mechanism whose mechanical configuration is such that as it adjusts it brings about coordinated motion of (i) the occupant's hips in a vertical direction and (ii) the seat base and seat squab rotationally. The motion is configured so that it may provide a range of comfortable positions for an occupant without the need for separate adjustment of base height, base rake and squab rake. The motion is provided in a coordinated way. For any vertical position of the seat's H point there is a single corresponding rotational position of the seat squab, and vice versa. The mechanism does not provide for motion of the H point height independently of seat squab rotational position, nor vice versa. The motion is configured so that the position of the base relative to the squab, and vice versa, is fixed during movement of the seat. In this way, the angle between the surface of the base that supports the occupant and the surface of the squab that supports the occupant may be fixed during the motion.

Figure 1:
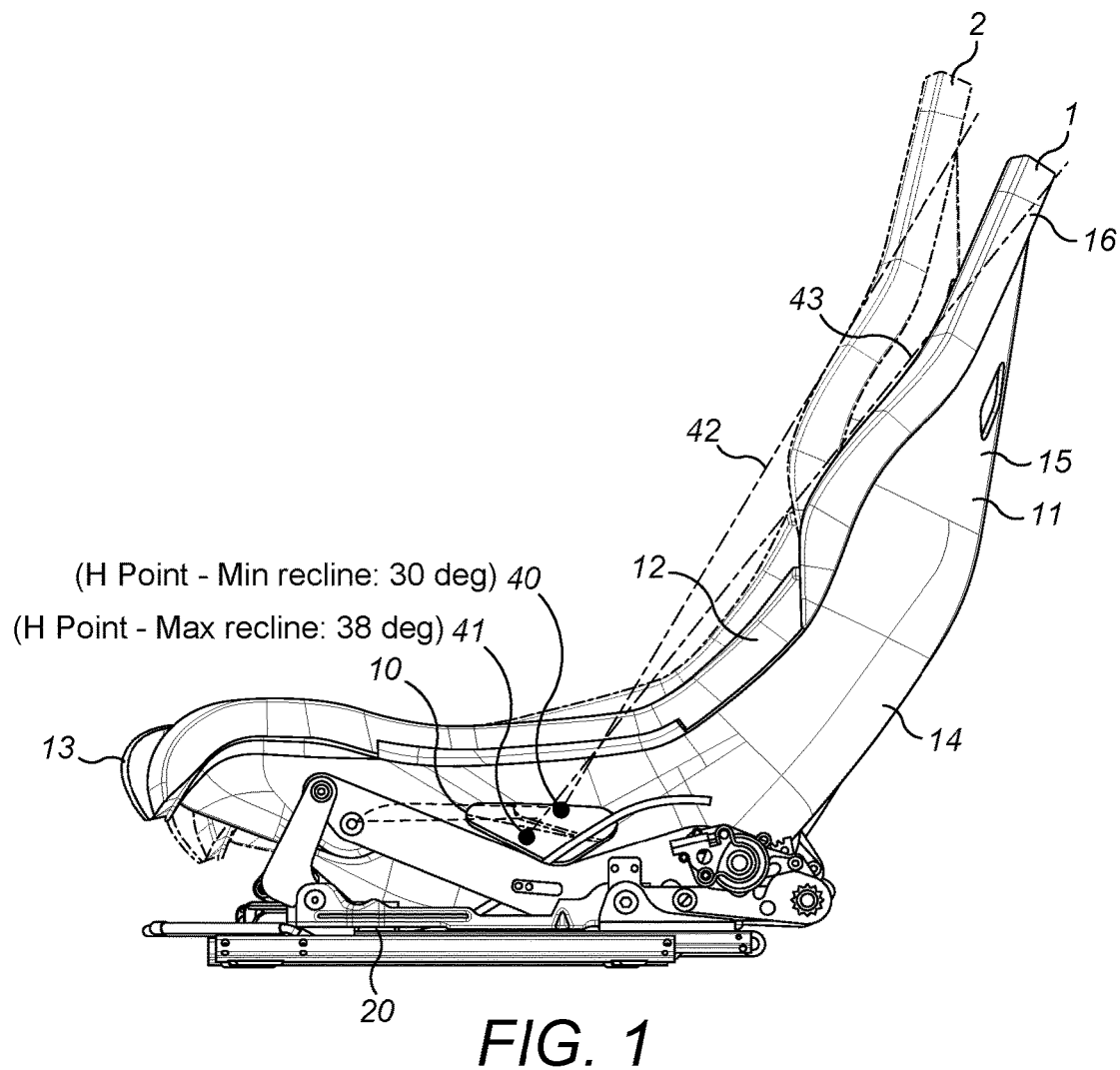
FIG. 1 is a side view of a vehicle seat and its adjustment mechanism.

FIG. 1 is a side view of a vehicle seat, illustrating two positions of the seat. The seat shown at 1 is at the lower extreme of its travel. In the figure, it is superimposed on the same seat as shown at 2, at the upper extreme of its travel.

Seat 1 is a bucket seat. The seat base 10 (also referred to as the seat bottom) and the seat squab 11 (also referred to as the seat back) are integral with each other. Their structure may be provided by a single piece of material, for example a fibre-reinforced plastics material such as carbon fibre. That piece may be formed as a shell. Wings 12 run along the sides of the seat, extending upwardly from the lateral edges of the base and forwards from the lateral edges of the squab. These help to restrain an occupant in the seat against lateral forces. The wings may also be integral with the base and the squab. The material that provides the structure of the squab and base may generally be in the form of a sheet, shaped to define the contours of the seat. On the upper side of the seat base and the front side of the seat squab the seat may be covered with padding such as foam and upholstery such as cloth or leather.

The seat base may be generally flat, or cupped to accommodate an occupant sitting on it. The seat base may comprise a front and a rear. At the forward end of the base is a thigh roll 13 for supporting an occupant's thighs.

The seat squab comprises a lumbar region 14 for accommodating the lumbar region of an occupant's back, a thoracic region 15 for accommodating the thoracic region of an occupant's back, and a headrest region 16 for acting as a headrest or head restraint. As illustrated in FIG. 1, the general plane of the thoracic region (and especially its laterally central strip) is angled with respect to the general plane of the lumbar region (and especially its laterally central strip). The general plane of the thoracic region may be at around 20° to 40° to the general plane of the lumbar region. That angular deviation between the thoracic and lumbar regions is about a lateral axis, with the thoracic region being more upright than the lumbar region. This configuration helps to place the occupant in a comfortable position.

Figure 2:
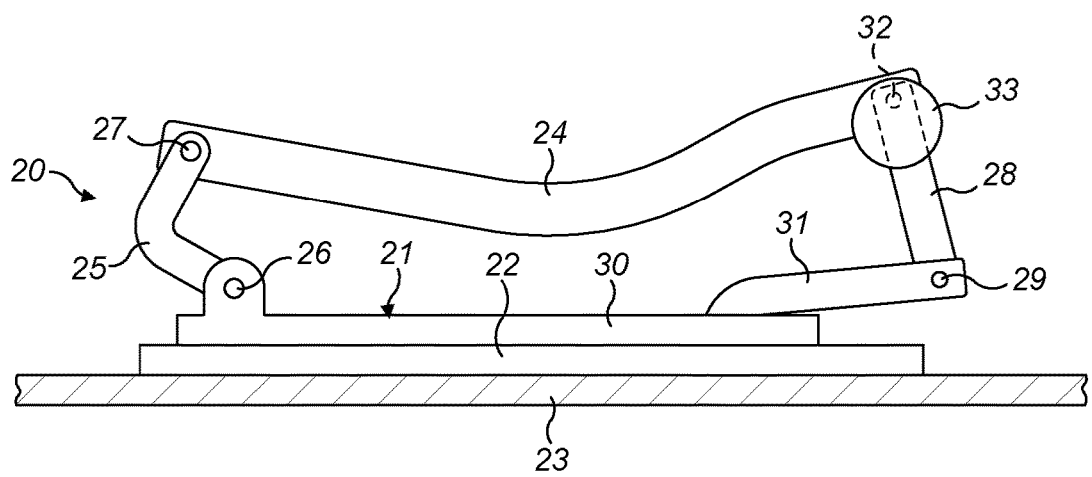
FIG. 2 shows the adjustment mechanism of the seat of FIG. 1 in more detail.

The seat is attached to the body of a vehicle by an adjustment mechanism 20. The adjustment mechanism is shown in more detail in FIG. 2. FIG. 2 shows the adjustment mechanism at one side of the seat, but the adjustment mechanism on the other side may be identical. The adjustment mechanism comprises a runner 21. The runner 21 forms a base for the adjustment mechanism. For fore and aft motion of the seat the runner is engaged with a longitudinal rail 22 which is attached to the floor pan 23 of the vehicle in which the seat is mounted. The runner can slide along the rail and be locked in place at a desired longitudinal position. This allows an occupant to select a comfortable reach position. A cradle 24 is attached to the body of the seat. The cradle is attached to the seat base. In the example of FIG. 1 the cradle is attached to the seat shell. Alternatively, the seat shell itself could be sufficiently stiff to perform the function of the cradle, in which case a separate cradle could be omitted.

A forward link 25 extends between the runner 21 and the cradle 24. The forward link is attached to the runner 21 by a revolute joint 26. Joint 26 is located near the forward end of the runner. The forward link is attached to the cradle by a revolute joint 27.

Joint 27 is located near the forward end of the cradle. The rotation axes of joints 26 and 27 are parallel and run laterally across the seat. When the seat is installed in a vehicle, these axes may be parallel to the vehicle's Y axis. Joints 26 and 27 are spaced apart along forward link 25. The forward link 25 is rigid. It supports the forward end of the cradle 24.

A rear link 28 extends between the runner 21 and the cradle 24. The rear link is attached to the runner 21 by a revolute joint 29. Joint 29 is located near the rear end of the runner. In the example shown in the figures, the runner comprises a primary portion 30 which engages with the rail 22 and a rear extension 31 which extends rearwardly from the primary portion; and joint 29 is located on the rear extension. The rear link 28 is attached to the cradle 24 by a revolute joint 32. Joint 32 is located near the rear end of the cradle. The rotation axes of joints 29 and 32 are parallel and run laterally across the seat. When the seat is installed in a vehicle, these axes may be parallel to the vehicle's Y axis. Joints 29 and 32 are spaced apart along rear link 28. The rear link 28 is rigid. It supports the rear end of the cradle 24.

A motor 33 is carried by the cradle 24. The motor 33 is configured to drive the rear link 28 to rotate relative to the cradle about joint 32. The motor 33 may be located at the joint 32. The motor may be directly connected to link 28. Alternatively, the motor could be located remotely from the joint (i.e. not directly connected to link 28) and drive may be completed by a cable or additional linkage running from the motor to the joint.

The links 25, 28, the cradle 24 and the runner 21 act as a four-bar linkage supporting the body of the seat. When the angle of link 28 is changed relative to link 24, the cradle 24 moves as guided by links 25, 28.

FIG. 1 shows the seat at two extremes of its motion as guided by the four-bar linkage. Its lower and more supine extreme is illustrated at 1. Its upper and more upright extreme is illustrated at 2. The H point for an occupant when the seat is at its lower extreme is indicated at 41. The H point for an occupant when the seat is at its upper extreme is indicated at 40. The corresponding torso lines are shown at 42 and 43 respectively. H points referred to in this document, and other lines defined in SAE J1100, such as the torso line, thigh centreline and leg centreline, may be determined according to SAE J1100 of June 1984 as applied at 1 Oct. 2016.

The nature of the seat's motion will now be described. As the seat moves from its lower extreme (1) to its upper extreme (2) the following actions occur in coordination:
  the rear of the base rises;
  the front of the base, e.g. the thigh roll 13, lowers;
  the squab becomes more upright;
  the H point moves upwards and rearwards as illustrated in FIG. 1.

The opposite actions occur when the seat moves in the opposite direction. It has been found that by linking upwards motion of the H point with increasing inclination of the seat squab, and preferably also with a rise in the thigh roll, the seat can remain comfortable at different H point heights without a need for independent adjustment of height, squab angle and base angle.

Figure 3:
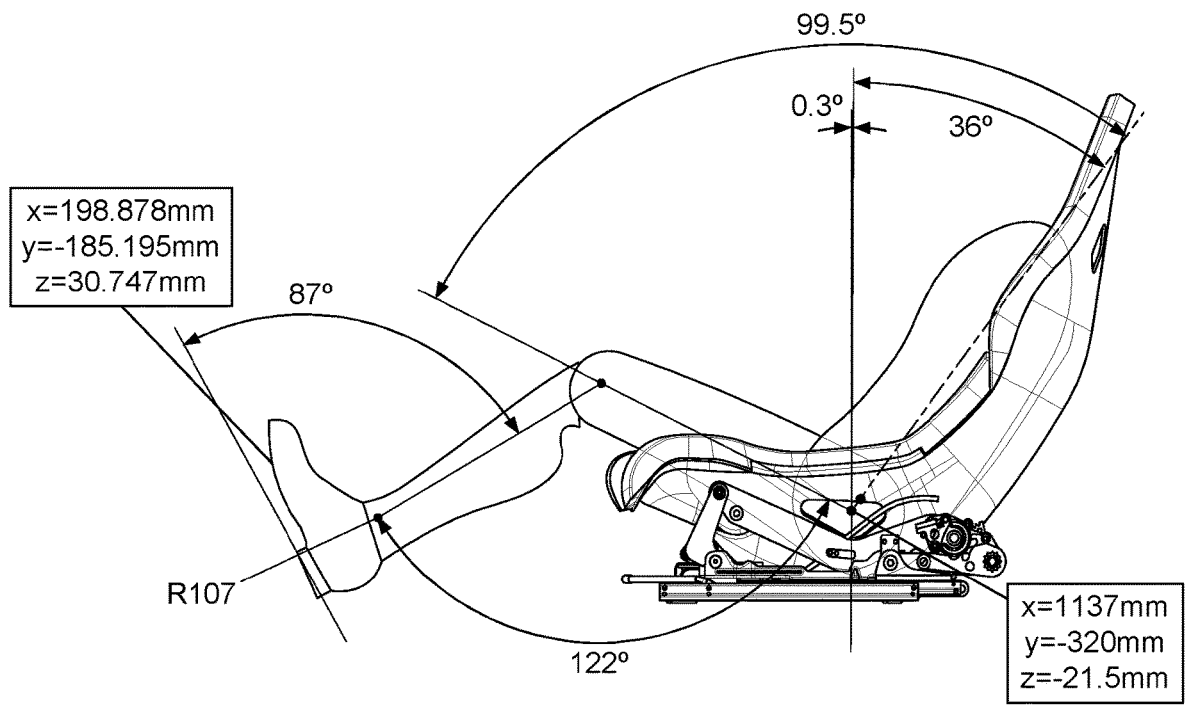
FIGS. 3 and 4 illustrate the movement range of the seat of FIG. 1.
Figure 4:
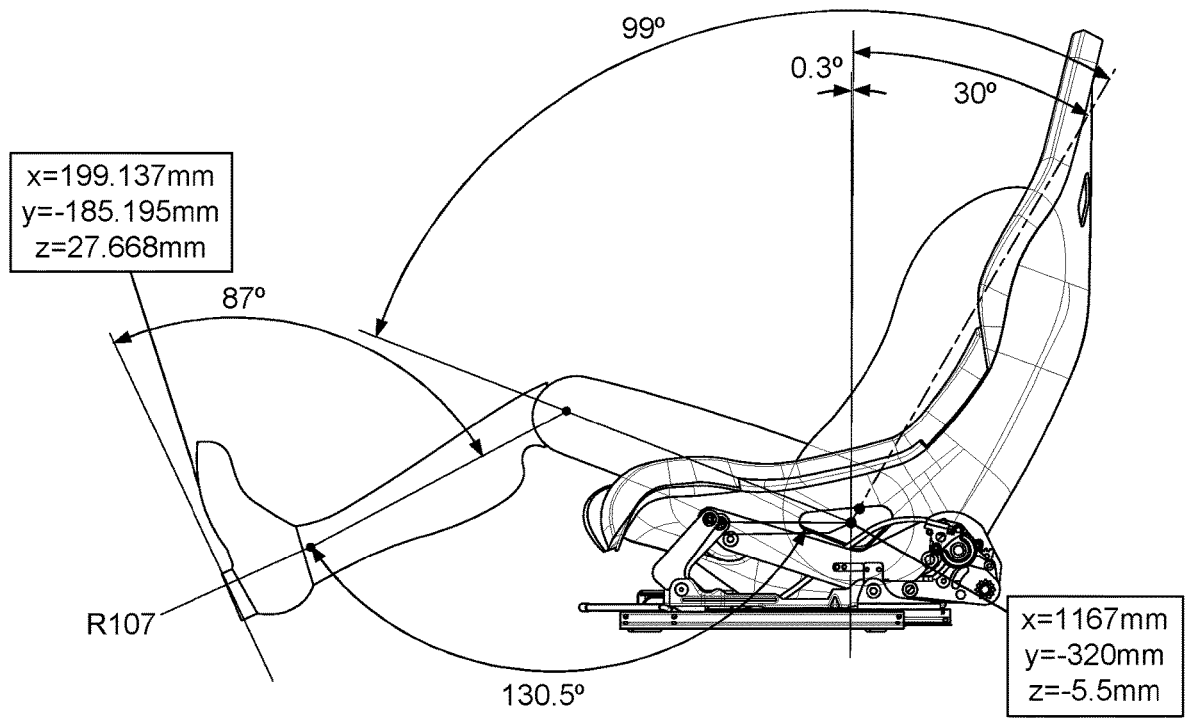

The range of motion of the seat is illustrated in more detail in FIGS. 3 and 4. FIG. 3 shows the seat in its lower and more supine or recumbent extreme. FIG. 4 shows the seat in its upper and more upright extreme. In each of FIGS. 3 and 4 the torso and leg of an occupant sitting in the seat are shown in outline. The occupant's foot is shown on a pedal, such as an accelerator or brake pedal. In FIGS. 3 and 4 the positions of the driver's H point and the ball of the driver's foot are indicated in vehicle X, Y and Z axes. The characteristics of the seating positions shown in FIGS. 3 and 4 are summarised in the following table.

| | Seat lower extreme (FIG. 3) | Seat upper extreme (FIG. 4) |
| --- | --- | --- |
| Angle of occupant's torso line behind vertical | 36° | 30° |
| Angle between the occupant's torso line and thigh centreline | 99.5° | 99° |
| Angle between occupant's thigh centreline and leg centreline | 122° | 130.5° |
| Angle between occupant's leg centreline and neutral pedal angle | 87° | 87° |
| Position of H point relative to seat lower extreme | Forwards = 0 mm Upwards = 0 mm | Rearwards = 30 mm Upwards = 16 mm |

In intermediate positions of the seat the characteristics approximately match a linear interpolation between the corresponding extreme values.

It has been found that with a motion of this nature the seat kinematics are such that it allows the seat height to be altered in coordination with the inclination of the occupant's torso angle whilst the seat remains comfortable, and without the need for fore/aft motion of the seat to accommodate a difference in leg reach associated with the change in vertical position or squab inclination. This provides a comfortable and convenient range of motion for an occupant without the need for independent adjustment mechanisms. The present mechanism can therefore be lighter than many existing adjustment mechanisms, without significantly compromising the occupant's comfort.

The mechanism is especially suitable for seats that are mounted close to a floor which extends substantially horizontally in front of the seat so as to provide a rest for the occupant's feet. In such a situation the occupant's feet can remain stationary and the occupant can remain comfortable as the seat is raised/lowered. The floor may extend substantially horizontally for 800 mm or more, or for 900 mm or more or for 950 mm or more in front of the H point of the seat. The deviation in height of the floor over that distance may be less than 100 mm or less than 50 mm or less than 20 mm or less than 10 mm. The H point of the seat may be within 30 cm or more preferably within 20 cm of the floor, in some or preferably in all seating configurations of the seat (the seat may, for example, additionally fold up into a non-seating configuration to allow access to a region behind the seat).

The mechanism is especially suitable for use with seats that operate at a relatively extreme supine angulation of the seat squab: for example, an angle of greater than 28° or greater than 30° to vertical. Seats of that nature are typically used in high-performance vehicles such as sports cars.

Seats configured with the adjustment mechanism described above may be used in any suitable application, for example in land vehicles, boats, aircraft and theatres. The seat may be a driver's seat. It may be in the front row of seats in a vehicle.

The seat shown in the figures is a bucket seat. The mechanism described above could be used with a seat having a greater range of adjustment: for example, adjustment of the base to squab angle.

It has been found that with the range of motion described above, there is no need to adjust the fore/aft position of the seat as it is raised and lowered. However, if desired it would be possible to have the seat move fore and aft in coordination with the raising and lowering motion. The fore/aft motion could be driven by a motor, for example a motor attached to the body of the vehicle and driving a lead screw that engages a thread carried by the runner 21. The control mechanism for that motor and motor 33 could be configured to drive the motors in coordination to achieve the desired combined movement. Also, additional mechanisms could be provided to adjust the seat vertically independently of recline motion, or to adjust the seat in recline independently of vertical motion.

The motion of the mechanism described above can be driven by motor 33 under the control of a switch operated by the occupant. Alternatively, the motion could be manual. A latch could be provided to hold the mechanism stationary. To move the seat, the occupant could disengage the latch and then move the seat to the desired position. A spring could be provided to help lift the seat.

The terms "forward", "rearward" and similar terms should be understood with respect to an occupant sitting normally in the seat.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle seat configured to be mountable to a vehicle floor pan, the seat comprising:
    a base,
    a squab, and
    an adjustment mechanism whereby the position of an occupant sitting in the seat can be adjusted,
    wherein:
        the mechanism is configured to permit the seat to follow a motion path that provides coordinated adjustment of both height and back inclination of the occupant, and
        the motion path is such that, as the height of the occupant is raised: (i) the back inclination of the occupant becomes less supine, (ii) the H point of the seat is moved rearwards, (iii) the front of the base lowers, and (iv) the position of the squab relative to the base is fixed.

2. A seat as claimed in claim 1, wherein the motion path provides adjustment of the H point height of the seat.

3. A seat as claimed in claim 1, wherein the base and the squab are integral with each other.

4. A seat as claimed in claim 1, wherein the motion path is such that the maximum torso line inclination of an occupant achieved by the mechanism is greater than 28 degrees from vertical.

5. A seat as claimed in claim 1, wherein, over a range of motion of the mechanism, the mean decrease in supine inclination of the torso line of the occupant is between 0.2 and 0.5 degrees per millimeter of increase in height of the H point of the seat.

6. A seat as claimed in claim 1, wherein, over a range of motion of the mechanism, the mean decrease in supine inclination of the torso line of the occupant is between 0.32 and 0.42 degrees per millimeter of increase in height of the H point of the seat.

7. A seat as claimed in claim 1, wherein, over a range of motion of the mechanism, the mean rearwards motion of the H point is between 1 mm and 3 mm per millimeter of increase in height of the H point of the seat.

8. A seat as claimed in claim 1, wherein, over a range of motion of the mechanism, the mean rearwards motion of the H point is between 1.3 mm and 2.3 mm per millimeter of increase in height of the H point of the seat.

9. A seat as claimed in claim 5, wherein the said range of motion is an entire range of motion provided by the mechanism.

10. A seat as claimed in claim 5, wherein the said range of motion encompasses more than 5 degrees of variation in the torso line of the occupant.

11. A seat as claimed in claim 5, wherein the said range of motion encompasses a state of the seat in which the torso line of the occupant is at 31 degrees of supine inclination to vertical.

12. A seat as claimed in claim 5, wherein the said range of motion encompasses a state of the seat in which the torso line of the occupant is at 35 degrees of supine inclination to vertical.

13. A seat as claimed in claim 5, wherein the said range of motion encompasses more than 10 mm of variation in the height of the H point of the seat.

14. A seat as claimed in claim 1, wherein the seat is mounted to a vehicle floor pan.

15. A seat as claimed in claim 1, further comprising one or more rails running longitudinally with respect to the seat, the mechanism being mounted on the rails so that the mechanism can be moved longitudinally with respect to the rails.

16. A seat as claimed in claim 1, wherein the mechanism comprises a base part, a forward link mounted between the base part and the seat base such that the forward link can rotate with respect to both the base part and the seat base, and a rear link mounted between the base part and the seat base such that the rear link can rotate with respect to both the base part and the seat base, the rear link being located rearwardly from the forward link, and the motion path of the seat being provided by rotation of the forward and rear links with respect to the base part and the seat base.

17. A vehicle comprising a seat as claimed in claim 1.

* * * * *